United States Patent
Morishima et al.

(10) Patent No.: US 8,232,008 B2
(45) Date of Patent: Jul. 31, 2012

(54) SECONDARY BATTERY

(75) Inventors: Hideaki Morishima, Saku (JP); Seiichi Hikata, Takasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 380 days.

(21) Appl. No.: 12/569,528

(22) Filed: Sep. 29, 2009

(65) Prior Publication Data
US 2010/0081042 A1  Apr. 1, 2010

(30) Foreign Application Priority Data

Sep. 30, 2008  (JP) .................................. 2008-255197

(51) Int. Cl.
  *H01M 4/70*  (2006.01)
  *H01M 2/26*  (2006.01)
  *H01M 6/10*  (2006.01)
(52) U.S. Cl. ............................ 429/233; 429/94; 429/211
(58) Field of Classification Search ................... 429/94, 429/124, 233, 59, 211
See application file for complete search history.

(56) References Cited

U.S. PATENT DOCUMENTS

| | | | |
|---|---|---|---|
| 5,350,645 A * | 9/1994 | Lake et al. | 429/124 |
| 6,300,002 B1 * | 10/2001 | Webb et al. | 429/94 |
| 6,410,189 B1 * | 6/2002 | Yamada et al. | 429/233 |
| 6,461,757 B1 * | 10/2002 | Sasayama et al. | 429/59 |

FOREIGN PATENT DOCUMENTS

| | | | |
|---|---|---|---|
| JP | 2000106167 A | * | 4/2000 |
| JP | 2006-79942 | | 3/2006 |
| JP | 2006/286404 A | * | 10/2006 |

OTHER PUBLICATIONS

Machine Translation of: JP 2006/286404, Kikuchi et al., Oct. 2006.*
Machine Translation of: JP 2006/079942, Inamine et al., Mar. 2006.*
Abstract of: JP 2006/286404, Kikuchi et al., Oct. 2006.*
Machine Translation of: JP 2000106167 A, Yoshioka et al., Apr. 11, 2000.*
U.S. Appl. No. 12/617,064, filed Nov. 12, 2009, Hikata, et al.

* cited by examiner

*Primary Examiner* — Jonathan Crepeau
*Assistant Examiner* — Kenneth Douyette
(74) *Attorney, Agent, or Firm* — Oblon, Spivak, McClelland, Maier & Neustadt, L.L.P.

(57) ABSTRACT

An electrode body of a secondary battery is formed by superimposing a positive electrode and a negative electrode upon each other with a belt-shaped separator interposed between the electrodes, and rolling up the positive and negative electrodes and the separator into a spiral shape. At least one side edge of a positive electrode current collector of the positive electrode in the longitudinal direction thereof includes a plurality of step parts discontinuously formed in the longitudinal direction at unequal intervals, and extends at both sides of each step part with a deviation of 0.2 mm or more. At least one side edge of a negative electrode current collector of the negative electrode in the longitudinal direction thereof includes a plurality of step parts discontinuously formed in the longitudinal direction at unequal intervals, and extends on both sides of each step part with a deviation of 0.2 mm or more.

7 Claims, 4 Drawing Sheets

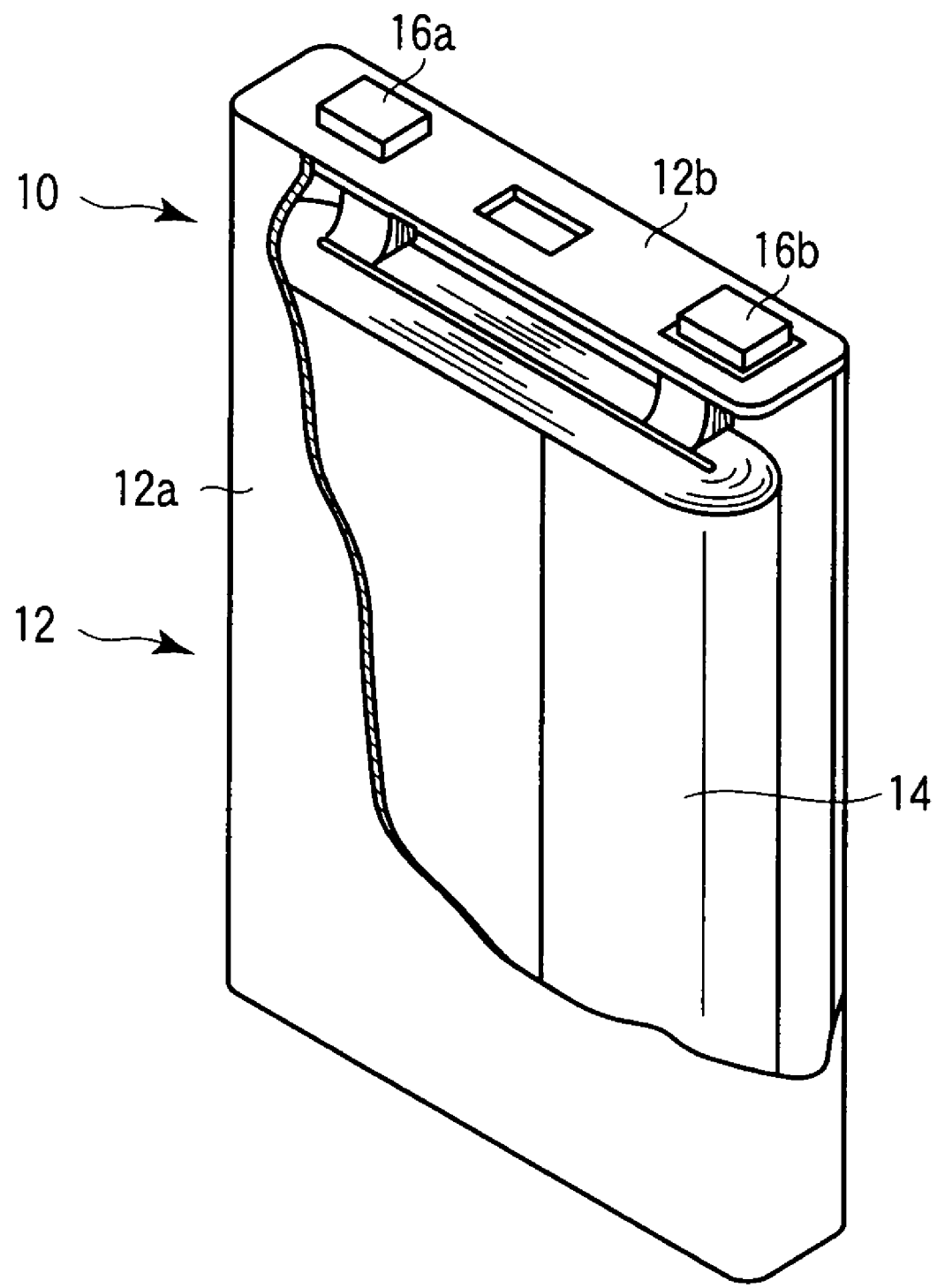
F I G. 1

SECONDARY BATTERY

CROSS-REFERENCE TO RELATED APPLICATIONS

This application is based upon and claims the benefit of priority from prior Japanese Patent Application No. 2008-255197, filed Sep. 30, 2008, the entire contents of which are incorporated herein by reference.

BACKGROUND OF THE INVENTION

1. Field of the Invention

The present invention relates to a secondary battery such as a non-aqueous electrolyte secondary battery or the like.

2. Description of the Related Art

In recent years, a secondary battery such as a non-aqueous electrolyte secondary battery or the like attracts attention as a power source of a hybrid electric vehicle or electric storage device for an electric generator that uses natural energy such as sunlight or wind. In general, a non-aqueous electrolyte secondary battery is provided with an exterior member constituted of a metallic container, a laminate film or the like, an electrode body contained in the exterior member together with an electrolyte liquid, and electrode terminals connected to the electrode body, and exposed to the outside.

The electrode body is configured by laying a negative electrode obtained by forming a negative electrode active material layer on a current collector plate on top of a positive electrode obtained by forming a positive electrode active material layer on a current collecting plate with a separator interposed between the electrodes, and rolling up the electrodes and separator into a spiral shape. Further, tabs for current collection are extended from a side edge of the current collector plate.

For example, in Jpn. Pat. Appln. KOKAI Publication No. 2006-79942, a non-aqueous electrolyte secondary battery provided with a rolled-up electrode body, in which the start and end of the roll are tapered to prevent short circuiting the electrodes due to rolling displacement occurring at the time of rolling up the negative electrode and positive electrode is proposed.

According to the non-aqueous electrolyte secondary battery configured as described above, it becomes possible to secure a sufficient charge and discharge capacity, and prevent the battery performance from lowering. However, in the conventional non-aqueous electrolyte secondary battery, when the temperature inside the battery rises for some reason, thermal contraction occurs in the separator for electrically insulating the positive electrode and negative electrode from each other, whereby the positive and negative electrodes are short-circuited, and the short-circuit current causes further heat generation, leading to thermal runaway, in some cases. For example, it is known that the internal temperature of a battery rises when overcharging above the rated charge is carried out inadvertently, and depending on the circumstances, there is the possibility of thermal runaway being caused due to thermal contraction of the separator.

BRIEF SUMMARY OF THE INVENTION

The present invention has been contrived in consideration of these circumstances, and an object thereof is to provide a secondary battery of improved safety and reliability.

According to an aspect of the invention, there is provided a secondary battery comprising: an electrode body formed by superimposing a positive electrode including a belt-shaped positive electrode current collector, a positive electrode active material layer formed on a surface of the positive electrode current collector, a plurality of positive electrode tabs protruding from one side edge of the positive electrode current collector in a longitudinal direction thereof, and formed integral with the positive electrode current collector; and a negative electrode including a belt-shaped negative electrode current collector, negative electrode active material layer formed on a surface of the negative electrode current collector, a plurality of negative electrode tabs each protruding from one side edge of the negative electrode current collector in a longitudinal direction thereof, and formed integral with the negative electrode current collector; upon each other with a belt-shaped separator interposed between the electrodes, and rolling up the positive and negative electrodes and the separator into a spiral shape, at least one side edge of the positive electrode current collector in the longitudinal direction thereof including a plurality of step parts discontinuously formed in the longitudinal direction at unequal intervals, and extending at both sides of each step part with a deviation of 0.2 mm or more, and at least one side edge of the negative electrode current collector in the longitudinal direction thereof including a plurality of step parts discontinuously formed in the longitudinal direction at unequal intervals, and extending on both sides of each step part with a deviation of 0.2 mm or more.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a perspective view showing a non-aqueous electrolyte secondary battery according to an embodiment of the present invention in a partly cutaway state;

DETAILED DESCRIPTION OF THE INVENTION

Figure 2:
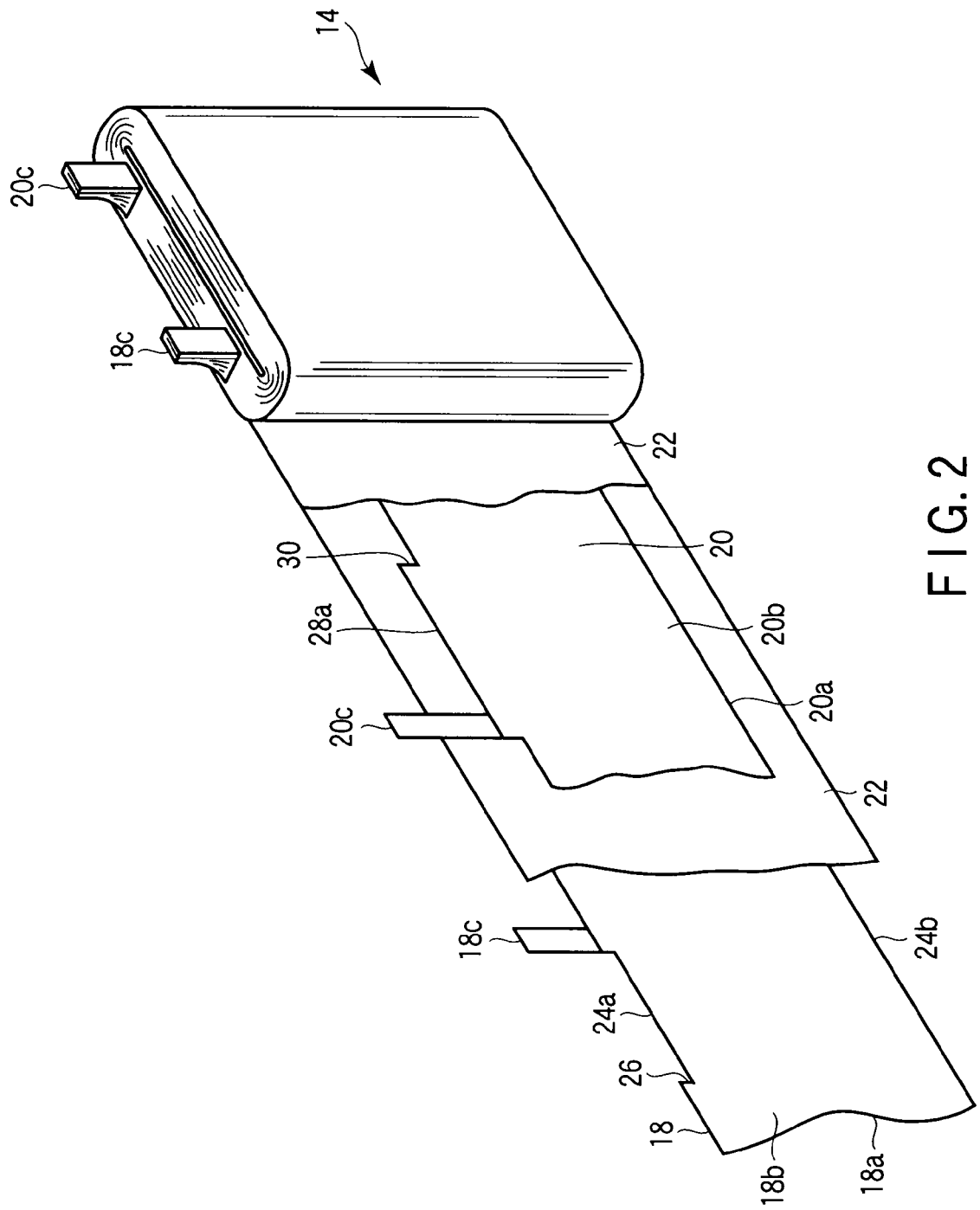
FIG. 2 is a perspective view of an electrode body of the non-aqueous electrolyte secondary battery in a partly expanded state.
Figure 3A:
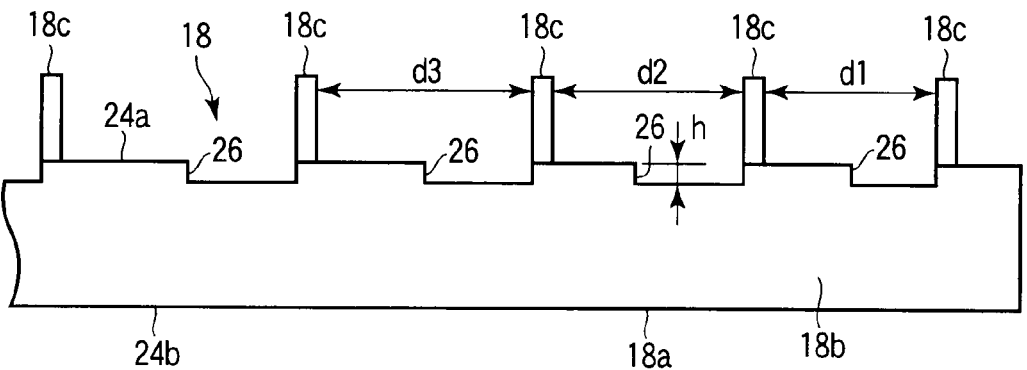
FIGS. 3A, 3B, and 3C are plan views respectively showing a positive electrode, negative electrode, and separator each constituting the electrode body.
Figure 3B:
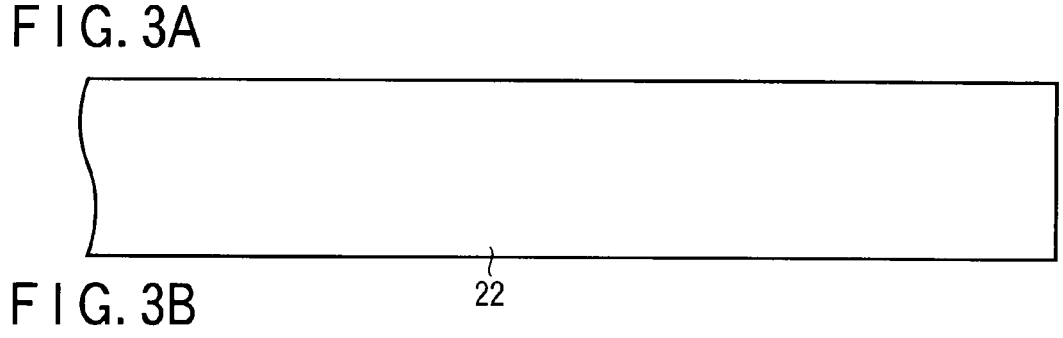
Figure 3C:
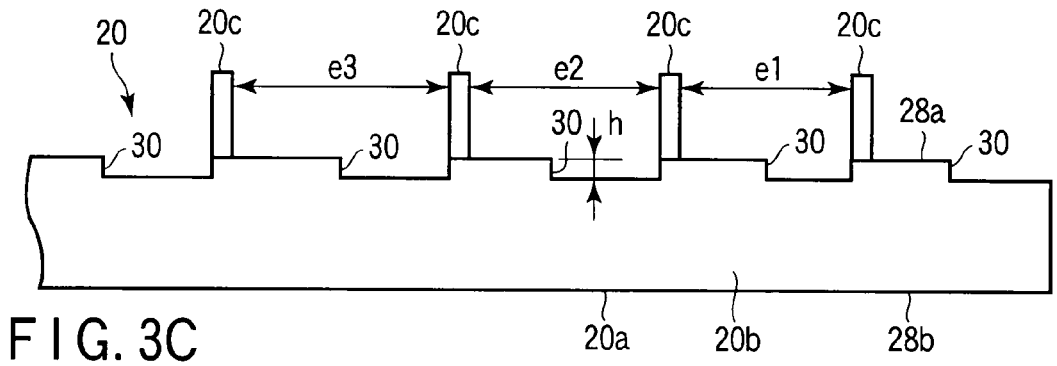
Figure 4:
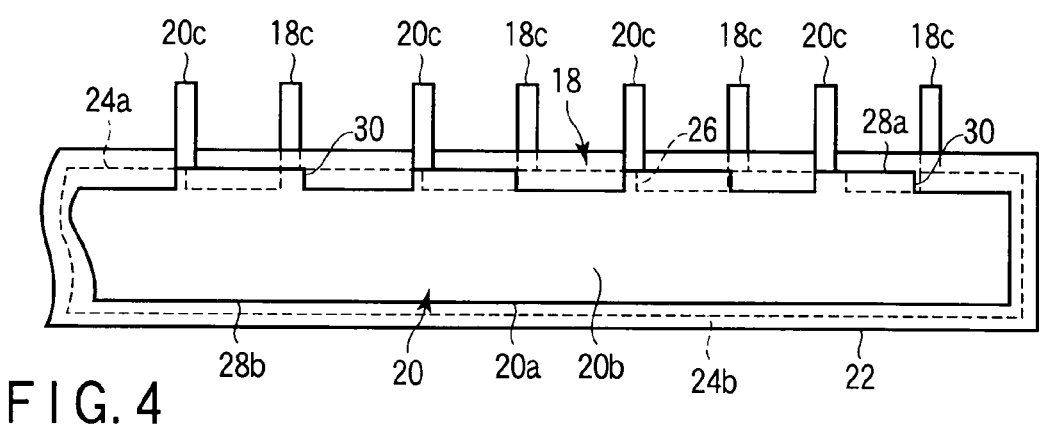
FIG. 4 is a plan view showing a state where the positive electrode, negative electrode, and separator are superimposed upon each other.

A non-aqueous electrolyte secondary battery according to an embodiment of the present invention will be described below in detail while referring to the accompanying drawings. FIG. 1 is a perspective view showing an external appearance of the non-aqueous electrolyte secondary battery according to the embodiment, FIG. 2 is a perspective view of an electrode body of the non-aqueous electrolyte secondary battery in a partly expanded state, FIGS. 3A, 3B, and 3C are plan views respectively showing a positive electrode, negative electrode, and separator each constituting the electrode body, and FIG. 4 is a plan view showing a state where the positive electrode, negative electrode, and separator are superimposed upon each other.

It should be noted that each drawing is a schematic view of the embodiment for promoting comprehension thereof, and there are parts different from an actual secondary battery in shape, dimension, ratio, and the like. However, these parts can be appropriately changed in design in consideration of the following description and prior art.

As shown in FIG. 1, a non-aqueous electrolyte secondary battery is configured as a slim secondary battery 10 such as a lithium-ion battery or the like. The secondary battery 10 includes, as an exterior member, a metallic container 12 having a flat rectangular box-shape, in which a rolled-up electrode body 14 is contained together with a non-aqueous electrolyte liquid. The container 12 includes a container main body 12a opened at an upper end thereof, and plate-shaped lid 12b fixed to the container main body, and closing the opening. A positive electrode terminal 16a, and a negative electrode terminal 16b are fixed to the lid 12b, and outwardly protrude therefrom. These positive and negative terminals 16a and 16b are respectively connected to a positive electrode and a negative electrode constituting the electrode body 14.

As shown in FIGS. 2, 3A, 3B, 3C, and 4, the electrode body 14 includes a belt-shaped positive electrode 18, a belt-shaped negative electrode 20, and a belt-shaped separator 22. The positive electrode 18 and negative electrode 20 are superimposed upon each other with the separator 22 interposed between the electrodes, the electrode body is rolled up into a spiral shape, and thereafter formed into a flat rectangular shape.

As shown in FIG. 3A, the positive electrode 18 includes a belt-shaped positive electrode current collector 18a constituted of aluminum foil or the like, and a positive electrode active material layer 18b supported on the entire surface of both sides of the positive electrode current collector 18a. The positive electrode current collector 18a includes side edges 24a and 24b extending in the longitudinal direction thereof. The positive electrode 18 includes a plurality of positive electrode tabs 18c for current collection protruding, substantially at right angles, from the one side edge 24a of the positive electrode current collector 18a. Each of the positive tabs 18c is formed of the same material as the positive electrode current collector 18a integral with the positive electrode current collector 18a, and extends from the positive electrode current collector without a break or joint.

The plurality of positive electrode tabs 18c are arranged in the longitudinal direction of the positive electrode current collector 18a with an unequal spacing (at an irregular pitch). The positive electrode tabs 18c are formed in such a manner that the intervals d1, d2, d3, ... between the positive electrode tabs 18c become gradually larger, for example, by a step of 1 mm; d1 is 100 mm, d2 is 101 mm, and d3 is 102 mm.

At least one of the side edges of the positive electrode current collector 18a, i.e., in this case, the side edge 24a on which the positive electrode tabs 18c are provided in a protruding manner includes a plurality of step parts 26 discontinuously formed in the longitudinal direction at unequal intervals. Each of the step parts 26 is formed at out of the adjacent positive electrode tabs 18c, e.g., between two adjacent positive electrode tabs 18c on the side edge 24a. A height h of each step part 26 is formed equal to or larger than 0.2 mm, and desirably 0.2 to 1.0 mm. As a result of this, the side edge 24a extends on both sides of each step part 26 by a length of 0.2 mm or larger. When the number of step parts 26 present on the side edge 24a of the positive electrode 18, i.e., the number of the gaps on the side edges 24a is set as N1, and the number of turns of the positive electrode 18 rolled up into a flat shape is set as N2, a relationship N1>(N2÷2) may be satisfied. Each step part 26 extends at substantially right angles or obliquely with respect to the side edge 24a.

The positive electrode 18 configured as described above is manufactured by the following steps. Each of both surfaces of a wide belt-like positive electrode current collector constituted of aluminum foil is coated with a positive electrode active material layer, the positive electrode active material layer is then dried, and then the positive electrode current collector and positive electrode active material layer are rolled into a desired thickness. Subsequently, both the side edge portions of the positive electrode current collector, and both the side edge portions of the positive electrode active material layer are punched into a desired shape by using a blanking die while intermittently advancing the positive electrode current collector on which the positive electrode active material layer is formed in the longitudinal direction thereof by a predetermined distance, whereby the side edge including a plurality of step parts, and a plurality of positive electrode tabs are cut out. At this time, the feed amount of the positive electrode current collector on which the positive electrode active material layer is formed is successively increased, whereby the plurality of positive electrode tabs are formed to be unequally spaced.

As shown in FIG. 3C, the negative electrode 20 includes a belt-like negative electrode current collector 20a constituted of a metal foil such as copper or aluminum, and negative electrode active material layer 20b supported on the overall surfaces on both sides of the negative electrode current collector 20a. The negative electrode current collector 20a includes both side edges 28a and 28b extending in the longitudinal direction thereof. It should be noted that the widths of the negative electrode current collector 20a and negative electrode active material layer 20b are slightly smaller than the widths of the positive electrode current collector 18a and positive electrode active material layer 18b.

The negative electrode 20 includes a plurality of negative electrode tabs 20c for current collection protruding, at substantially right angles, from the one side edge 28a of the negative electrode current collector 20a. Each of the negative tabs 20c is formed of the same material as the negative electrode current collector 20a integral with the negative electrode current collector, and extends from the negative electrode current collector without a break or joint.

The plurality of negative electrode tabs 20c are arranged in the longitudinal direction of the negative electrode current collector 20a with an unequal spacing (at an irregular pitch). The negative electrode tabs 20c are formed in such a manner that the intervals e1, e2, e3, ... between the negative electrode tabs 20c become gradually larger, for example, by a step of 1 mm; e1 is 100 mm, e2 is 101 mm, and e3 is 102 mm.

At least one of the side edges of the negative electrode current collector 20a, i.e., in this case, the side edge 28a on which the negative electrode tabs 20c are provided in a protruding manner includes a plurality of step parts 30 discontinuously formed in the longitudinal direction at unequal intervals. Each of the step parts 30 is formed at out of the adjacent negative electrode tabs 18c, e.g., between two adjacent negative electrode tabs 20c on the side edge 28a. A height h of each step part 30 is equal to or larger than 0.2 mm, and desirably 0.2 to 1.0 mm. As a result of this, the side edge 28a extends on both sides of each step part 30 by a length of 0.2 mm or larger. When the number of step parts 30 present on the side edge 28a of the negative electrode 20, i.e., the number of the gaps on the side edge 28a is set as M1, and number of turns of the negative electrode 20 rolled up into a flat shape is set as M2, a relationship M1>(M2÷2) may be satisfied.

The negative electrode 20 configured as described above is manufactured by the following steps. Each of both surfaces of a belt-shaped negative electrode current collector constituted of a wide metallic foil is coated with a negative electrode active material layer, thereafter the negative electrode active material layer is dried, and further the negative electrode current collector and negative electrode active material layer are rolled into a desired thickness. Subsequently, both the side edge portions of the negative electrode current collector, and both the side edge portions of the negative electrode active material layer are punched into a desired shape by using a blanking die while intermittently advancing the negative electrode current collector on which the negative electrode active material layer is formed in the longitudinal direction thereof by a predetermined distance, whereby the side edge 28a including a plurality of step parts 30, and a plurality of negative electrode tabs 20c are cut out. At this time, the feed amount of the negative electrode current collector 20a on which the negative electrode active material layer 20b is formed is successively increased, whereby the plurality of negative electrode tabs 20c are formed at an unequal spacing.

As shown in FIG. 3B, the separator 22, which is formed of cellulose or the like, is formed into a belt-shape, and a width thereof is slightly larger than those of the positive electrode current collector 18a and positive electrode active material layer 18b.

As shown in FIGS. 2 and 4, the positive electrode 18 and the negative electrode 20 are superimposed upon each other with the separator 22 interposed between the electrodes. At this time, the negative electrode 20 is arranged in such a manner that each of the outer edges thereof is opposed to the inner side of each of the outer edges of the positive electrode active material layer 18b of the positive electrode 18 except for the negative electrode tabs 20c. The separator 22 is arranged to be superimposed on the positive electrode 18 and negative electrode 20 in such a manner that the outer edges thereof are positioned within a range outside the positive electrode, and not outwardly exceeding the positive electrode tabs 18 and negative electrode tabs 20c. Furthermore, the positive electrode 18, negative electrode 20, and separator 22 are rolled up into a spiral shape around an axis perpendicular to the longitudinal direction of the positive electrode 18, and further the above resultant positive electrode is formed into a flat shape, whereby the electrode body 14 is formed. In the above rolled-up state, the plurality of positive electrode tabs 18c are positioned to overlap each other, and protrude from one end of the electrode body 14. The plurality of negative electrode tabs 20c are also positioned to overlap each other, and protrude from one end of the electrode body 14.

The electrode body 14 formed in this manner is contained in the metallic container 12 together with the electrolyte liquid, and the positive electrode tabs 18c, and negative electrode tabs 20c are respectively connected to the positive electrode terminal 16a, and negative electrode terminal 16b.

Next, each constituent element of the secondary battery 10 will be described below in detail.

(Positive Electrode Slurry and Positive Electrode)

The positive electrode active material layer 18b is formed by coating the positive electrode with a slurry positive electrode. The positive electrode slurry is formed by mixing a positive electrode active material, positive electrode conductive agent, and binding agent with each other. As the positive electrode active material to be contained in the positive electrode slurry, a generally used lithium transition metal compound oxide can be used. Examples of the above transition metal compound oxide include $LiCoO_2$, $LiNi1-xCoxO_2$ (0<x<0.3), $LiMnxNiyCozO_2$ (0<x<0.5, 0<y<0.9, 0≦z<0.5), $LiMn2-xMxO_4$ (M is Li, Mg, Co, Al, Ni, 0<x<0.2), $LiMPO_4$ (M is Fe, Co, Ni), and the like.

Examples of the positive electrode conductive agent for enhancing the current collection performance, and reducing the contact resistance associated with the current collector include carbonaceous matter such as acetylene black, carbon black, graphite, and the like.

Examples of the binding agent for binding the positive electrode active material and positive electrode conductive agent with each other include polytetrafluoroethylene (PTFE), polyvinylidene-fluoride (PVdF), fluorine-containing rubber, and the like.

As for the compounding ratio of the positive electrode active material, positive electrode conductive agent, and binding agent, it is desirable that the positive electrode active material be 80% by weight or more, and 95% by weight or less, the positive electrode conductive agent be 3% by weight or more, and 18% by weight or less, and the binding agent be 2% by weight or more, and 17% by weight or less. As for the positive electrode conductive agent, at 3% by weight or more, it is possible for the positive electrode conductive agent to exhibit the above-mentioned effect, and at 18% by weight or less, it is possible for the agent to reduce decomposition of the non-aqueous electrolyte on the surface of the positive electrode conductive agent in high-temperature storage. As for the binding agent, at 2% by weight or more, it is possible for the binding agent to obtain sufficient electrode strength, and at 17% by weight or less, it is possible for the agent to reduce the blending quantity of the electrode insulator, and reduce the internal resistance.

The slurry is prepared by suspending the positive electrode active material, conductive agent, and binding agent in an appropriate solvent. An example of the solvent is N methyl ethyl pyrrolidone. It is desirable that the weight ratio of the gross weight of the positive electrode active material, conductive agent, and binding agent to the weight of the solvent be 50:50 to 80:20.

It is desirable that the positive electrode current collector 18a serving also as a backing to be coated with the slurry be constituted of aluminum foil or foil of an aluminum alloy containing an element such as Mg, Ti, Zn, Mn, Fe, Cu, Si, or the like.

The positive electrode is prepared by suspending, for example, the positive electrode active material, positive electrode conductive agent, and binding agent in an appropriate solvent, coating the positive electrode current collector with the slurry obtained as the suspended matter, drying the resulting material to manufacture a positive electrode layer, and thereafter subjecting the positive electrode layer to a pressing process.

(Negative Electrode Slurry and Negative Electrode)

The negative electrode active material layer 20b is formed by coating the negative electrode with negative electrode slurry. The negative electrode slurry is formed by mixing a negative electrode active material, negative electrode conductive agent, and binding agent with each other.

This negative electrode active material is a material capable of occluding (doping)/discharging (dedoping) lithium.

Examples of such a material include a metallic oxide capable of occluding/discharging lithium, metallic sulfide capable of occluding/discharging lithium, metallic nitride capable of occluding/discharging lithium, chalcogen compound capable of occluding/discharging lithium, carbon material capable of occluding/discharging lithium ions, and the like.

Examples of the carbon material capable of occluding/discharging lithium ions include coke, carbon fiber, a thermal decomposition gaseous phase carbonaceous substance, graphite, a resin burned substance, mesophase pitch-based carbon fiber, mesophase pitch spheroidal carbon, and the like. The carbon materials of the above-mentioned types can enhance the electrode capacity, and are therefore desirable.

Examples of the chalcogen compound include titanium disulfide, molybdenum disulfide, niobium selenide, tin oxide, and the like. When such a chalcogen compound is used for the negative electrode, although the battery voltage is lowered, the capacity of the negative electrode is increased, and hence the capacity of the secondary battery is improved. A negative electrode containing the above carbon material is manufactured by kneading, for example, the above carbon material with the binding agent in the presence of a solvent, applying the obtained suspended matter to the current collector, and drying the resultant carbon material.

As the metallic oxide capable of occluding/discharging lithium ions, for example, a metallic compound oxide containing titanium can be used, and examples thereof include a lithium-titanium oxide, titanium-based oxide containing no lithium at the time of the oxide synthesis, and the like.

Examples of the lithium-titanium oxide include $Li_4+xTi_5O_{12}$ ($0 \leq x \leq 3$) with a spinel structure, and $Li_2+yTi_3O_7$ ($0 \leq y \leq 3$) with a ramsdellite structure.

Examples of the titanium-based oxide include $TiO_2$, and a metallic compound oxide containing Ti, and at least one kind of element selected from a group constituted of P, V, Sn, Cu, Ni, Co, and Fe. As for $TiO_2$, $TiO_2$ of the anatase type, with a heat treatment temperature of 300 to 500° C., and which is of low crystallizability is desirable.

Examples of the metallic compound oxide containing Ti, and at least one kind of element selected from a group constituted of P, V, Sn, Cu, Ni, Co, and Fe include $TiO_2$—$P_2O_5$, $TiO_2$—$V_2O_5$, $TiO_2$—$P_2O_5$—$SnO_2$, $TiO_2$—$P_2O_5$-MeO (Me is at least one kind of element selected from a group constituted of Cu, Ni, Co, and Fe), and the like. It is desirable that this metallic compound oxide be of a micro-structure in which the crystalline phase and amorphous phase coexist, or the amorphous phase exists alone. By employing a metallic compound oxide being of such a micro-structure, it is possible to largely improve the cycle performance. Above all, a metallic compound oxide containing lithium-titanium oxide, Ti, and at least one kind of element selected from a group constituted of P, V, Sn, Cu, Ni, Co, and Fe is desirable.

Examples of the negative electrode conductive agent include acetylene black, carbon black, graphite, and the like.

Examples of the binding agent for binding the negative electrode active material and negative electrode conductive agent with each other include polytetrafluoroethylene (PTFE), polyvinylidene-fluoride (PVdF), fluorine-containing rubber, styrene-butadiene rubber, and the like.

As for the compounding ratio of the negative electrode active material, negative electrode conductive agent, and binding agent, it is desirable that the negative electrode active material be 70% by weight or more, and 96% by weight or less, the negative electrode conductive agent be 2% by weight or more, and 28% by weight or less, and the binding agent be 2% by weight or more, and 28% by weight or less. When the negative electrode conductive agent is less than 2% by weight, the current collection performance of the negative electrode layer lowers, and the high-current characteristic of the non-aqueous electrolyte secondary battery lowers. Further, when the binding agent is less than 2% by weight, the binding property of binding the negative electrode layer and negative electrode current collector with each other lowers, and the cycle characteristic lowers. On the other side, from the viewpoint of the tendency toward higher capacity, it is desirable that each of the negative electrode conductive agent and binding agent be 28% by weight or less.

The negative electrode slurry is prepared by suspending the negative electrode active material, conductive agent, and binding agent in an appropriate solvent. An example of the solvent is N-methyl-ethyl-pyrrolidone. It is desirable that the weight ratio of the gross weight of the negative electrode active material, conductive agent, and binding agent to the weight of the solvent be 50:50 to 80:20.

As the negative electrode current collector 20a serving also as a backing to be coated with the negative electrode slurry, a metal foil such as copper or the like can be used.

Further, it is desirable that the negative electrode current collector 20a serving also as a backing to be coated with the negative electrode slurry be constituted of aluminum foil or aluminum alloy foil containing an element such as Mg, Ti, Zn, Mn, Fe, Cu, Si, and the like, the aluminum foil and aluminum alloy foil being electrochemically stable in a potential range nobler than 1V.

The negative electrode 20 is manufactured by coating the negative electrode current collector with the slurry prepared by suspending, for example, the negative electrode active material, negative electrode conductive agent, and binding agent in a solvent used for various purposes, drying the slurry to manufacture a negative electrode layer, and thereafter subjecting the negative electrode layer to a pressing process.

(Non-Aqueous Electrolyte)

Examples of the non-aqueous electrolyte include a liquid non-aqueous electrolyte prepared by dissolving an electrolyte in an organic solvent, gel non-aqueous electrolyte obtained by compounding a liquid electrolyte and polymeric material, and the like.

The liquid non-aqueous electrolyte is prepared by dissolving an electrolyte in an organic solvent at a concentration of 0.5 mol/l or more, and 2.5 mol/l or less.

Examples of the electrolyte include lithium salts such as lithium perchlorate ($LiClO_4$), lithium hexafluorophosphate ($LiPF_6$), lithium tetrafluoroborate ($LiBF_4$), arsenic lithium hexafluoride ($LiAsF_6$), lithium trifluoromethanesulfonate ($LiCF_3SO_3$), lithium bistrifluoromethylsulfonylimide [$LiN(CF_3SO_2)_2$], and the like, or mixtures of these. It is desirable that the electrolyte not oxidize at a high potential, and $LiPF_6$ is the most desirable.

Examples of the organic solvent include cyclic carbonates such as propylene carbonate (PC), ethylene carbonate (EC), vinylene carbonate, and the like, chain carbonates such as diethyl carbonate (DEC), dimethyl carbonate (DMC), methyl ethyl carbonate (MEC), and the like, cyclic ether such as tetrahydrofuran (THF), 2-methyltetrahydrofuran (2MeTHF), dioxolane (DOX), and the like, chain ether such as dimethoxyethane (DME), diethoethane (DEE), and the like, and single or mixed solvents such as γ-buthyrolactone (GBL), acetonitrile (AN), sulfolane (SL), and the like.

Examples of the polymeric material include polyvinylidene-fluoride (PVdF), polyacrylonitrile (PAN), polyethylene oxide (PEO), and the like.

It should be noted that as the non-aqueous electrolyte, an ambient temperature molten salt containing lithium ions (ionic melt), polymeric solid electrolyte, inorganic solid electrolyte, and the like may be used.

The ambient temperature molten salt (ionic melt) refers to a compound that can exist as a liquid at an ambient temperature (15° C. to 25° C.) of organic salts each constituted of a combination of organic matter cations and anions. Examples of the ambient temperature molten salt include an ambient temperature molten salt existing as a liquid in a simple substance, ambient temperature molten salt that becomes a liquid by being mixed with an electrolyte, and ambient temperature molten salt that becomes a liquid by being dissolved in an organic solvent, and the like. It should be noted that in general, a melting point of an ambient temperature molten salt used for a non-aqueous electrolyte battery is 25° C. or lower. Further, in general, an organic matter cation includes a quaternary ammonium skeleton.

The polymeric solid electrolyte is prepared by dissolving an electrolyte in a polymeric material, and solidifying the resulting material. The inorganic solid electrolyte is a solid provided with lithium ion conductivity.

(Separator)

Examples of the material for the separator 22 include a porous film including polyethylene, polypropylene, cellulose or polyvinylidene-fluoride (PVdF), nonwoven fabric made of synthetic resin, and the like. Of the above, a porous film constituted of polyethylene or polypropylene that melts at a fixed temperature to cut the current is desirable from the viewpoint of improvement in safety.

(Exterior Member of Battery)

Examples of the exterior member include a metallic container with a thickness of 0.5 mm or less, and a laminated film with a thickness of 0.2 mm or less. A metallic container with a thickness of 0.3 mm or less is more desirable.

Examples of the shape of the exterior member include a flat type, rectangular type, cylindrical type, coin type, button type, sheet type, lamination type, and the like. It should be noted that the battery may naturally be a large battery mounted on a two-wheeled or four-wheeled vehicle, or the like in addition to a small battery incorporated in a portable electronic device or the like.

Examples of the metallic container include containers made of aluminum or an aluminum alloy. As the aluminum alloy, an alloy containing an element such as magnesium, zinc, silicon, and the like is desirable. On the other hand, it is desirable that the content of a transition metal such as iron, copper, nickel, chrome, and the like be 1% or less. As a result of this, it becomes possible to remarkably improve the long-term reliability in a high-temperature environment, and the heat-radiation property.

The laminated film is a multilayer film constituted of metallic layers and resin layers covering the metallic layers. It is desirable, for the sake of weight reduction, that the metallic layer be aluminum foil or an aluminum alloy foil. The resin layer is used to reinforce the metallic layer, and a polymeric material such as polypropylene (PP), polyethylene (PE), nylon, polyethylene terephthalate (PET), and the like can be used for the layer. The laminated film is formed by carrying out sealing by means of thermal fusion bonding.

According to the secondary battery 10 configured in the manner described above, the side edge of each of the positive electrode and negative electrode with the exception of the current collection tabs does not form a straight line or a smooth curve, and discontinuously includes a plurality of step parts, each of which extends with a deviation of 0.2 mm or more at each step position. According to the secondary battery in which such a positive electrode and negative electrode are used, it is possible, upon a rise in the internal temperature, to prevent thermal contraction of the separator 22, and prevent the positive electrode and negative electrode from being short-circuited. As a result of this, it is possible to obtain a secondary battery of improved safety and reliability.

It is presumed that the above-mentioned improvement in safety is due to the following reasons.

In the case where step parts are formed at a plurality of positions on the side edge in the longitudinal direction of the electrode rolled up into a cylindrical or flat shape, when the separator 22 separating the positive electrode 18 and negative electrode 20 from each other contracts due to heat, the separator is caught by the step parts, whereby the contraction of the separator is adversely affected. According to the secondary battery configured in the manner described above, even under such a condition that the positive electrode and negative electrode are short-circuited if the step parts are not provided, a short circuit is never caused, and a high degree of safety can be obtained.

Furthermore, when the amount of deviation of the electrode side edge is smaller than 0.2 mm, the deviation is not sufficient to catch the contracting separator, and so is of no consequence. However, when the amount of deviation is excessively large, a useless space in which the electrode is not present is increased inside the electrode body, leading to lowering of the battery capacity. Accordingly, it is desirable that the amount of the deviation be 0.2 mm or more, and 1 mm or less.

When the number of the deviation parts present on the positive electrode is set as N1, and the number of turns of the positive electrode rolled up into a cylindrical shape or flat shape is set as N2, it is desirable that a relationship of N1>(N2÷2) be satisfied. When this relationship is satisfied, deviation parts, i.e., step parts are present at an average rate of one step part per two turns of the rolled-up electrode body, and the separator, which tends to contract, is caught on the step parts in a relatively easy manner. When the number of step parts is smaller than this, it is conceivable that the number of step parts is not sufficient to catch the separator, which tends to contract. When the number of the deviation parts is excessively large, handling of the electrode is made difficult in the manufacture, and hence a relationship of N1<(N2×2) is more desirable.

For the same reason, when the number of the deviation parts present on the negative electrode is set as M1, and the number of turns of the negative electrode rolled up into a cylindrical shape or flat shape is set as M2, it is desirable that a relationship of M1>(M2÷2) be satisfied. When this relationship is satisfied, deviation parts, i.e., step parts are present at an average rate of one step part per two turns of the rolled-up electrode body, and the separator, which tends to contract, is presumed to be caught on the step parts in a relatively easy manner. When the number of step parts is smaller than this, it is conceivable that the number of step parts is not sufficient to catch the separator, which tends to contract. When the number of the deviation parts is excessively large, handling of the electrode is made difficult in the manufacture, and hence a relationship of M1<(M2×2) is more desirable.

In order to confirm the function/effect of the secondary battery, electrode bodies of secondary batteries according to the following examples 1 to 4, and comparative examples 1 and 2 were formed, and the characteristics were compared with each other.

Example 1

Figure 5A:
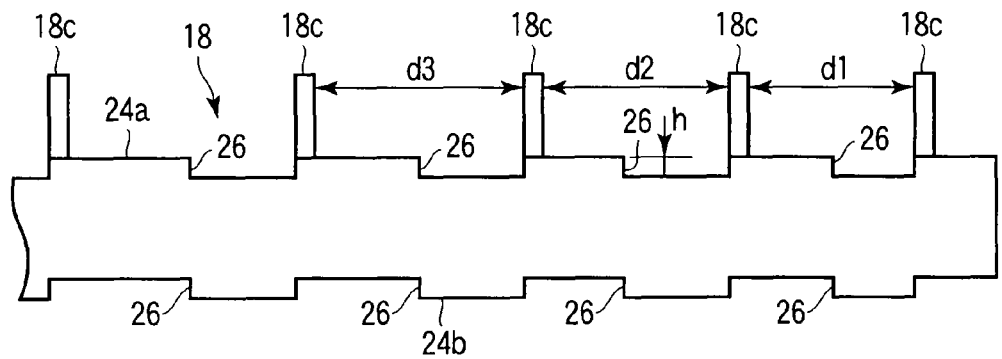
FIGS. 5A and 5B are plan views respectively showing a positive electrode, and negative electrode of a non-aqueous electrolyte secondary battery according to example 1.
Figure 5B:
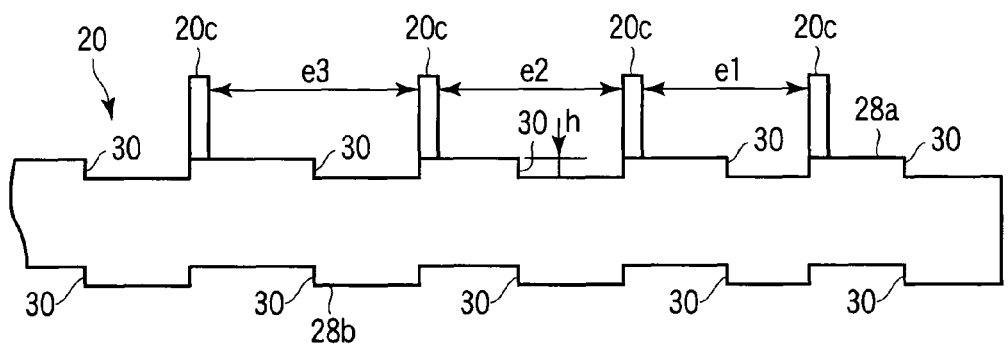

As shown in FIGS. 5A and 5B, on each of both side edges of the positive electrode 18 in the longitudinal direction thereof, step parts 26 each having a height of 0.2 mm, and deviations were formed at eleven positions.

On each of both side edges of the negative electrode 20 in the longitudinal direction thereof, step parts 30 each having a height of 0.2 mm, and deviations were formed at eleven positions. The positive electrode 18 and negative electrode 20 were rolled up into a flat shape with the separator 22 interposed between the electrodes. The number of turns when each of the positive and negative electrodes was rolled up was 20.

As the positive electrode active material, $LiCoO_2$ was used, acetylene black, and carbon black were added thereto as an electric conduction auxiliary agent, polyvinylidene-fluoride was added thereto as a binding agent, predetermined amounts of the above materials were mixed with each other together with a solvent to obtain a paste-like matter, the resulting material was applied onto an aluminum current collector, and was dried, whereby a positive electrode was manufactured.

Further, as the negative electrode active material, carbon fiber was used, styrene-butadiene rubber was added thereto as a binding agent, predetermined amounts of the above materials were mixed with each other together with a solvent to obtain paste-like matter, the resulting material was applied onto a copper current collector, and was dried, whereby a negative electrode was manufactured.

As the non-aqueous electrolyte, the following liquid non-aqueous electrolyte was used. First, methyl ethyl carbonate and ethylene carbonate were mixed with each other in the ratio of 2:1. Further, $LiPF_6$ was dissolved in the above resulting material in the ratio of 1 mol/l, whereby a liquid non-aqueous electrolyte was obtained.

An overcharge test of this secondary battery was then carried out. First, the secondary battery was brought into the fully-charged state. The second battery in the fully-charged state was further charged, whereby the battery was brought into the overcharged state. The battery surface temperature at this time was measured. Although the temperature rose in the overcharged state, when observation was continued, the temperature began to lower after a while, and the battery did not result in thermal runaway. The experiment was repeated three times, which did not lead to thermal runaway of the battery. The results are shown in Table 1 below.

Example 2

The following external short-circuit test was carried out by using the same secondary battery as example 1. The second battery was brought into the fully-charged state. Thereafter, a resistance of 10 mΩ was connected to the second battery, and the battery was discharged. As a result of this, the battery did not result in thermal runaway. The experiment was repeated three times, which did not result in thermal runaway of the battery. The results are shown in Table 1 below.

Example 3

A plurality of step parts and deviations were formed only on the side edge of the electrode of the side on which the current collection tabs are provided, and the side edge on the opposite side was made a linear side edge without step parts. Other configurations were identical with example 1, and a secondary battery was manufactured. The same overcharge test as example 1 was carried out on this secondary battery, and the battery did not result in thermal runaway. However, in the second experiment, white smoke was emitted from the battery, leading to thermal runaway. In the third experiment, the battery did not result in thermal runaway. The results are shown in Table 1.

Example 4

The same external short-circuit test as example 2 was conducted on the same secondary battery as example 3, and the battery did not result in thermal runaway. The experiment was repeated three times, which did not lead to thermal runaway of the battery. The results are shown in Table 1.

Example 5

A secondary battery identical to that of example 1 was manufactured except for the fact that the size of the deviations formed on both side edges of the positive electrode in the longitudinal direction thereof was a height of 0.5 mm, and the size of the deviations formed on both side edges of the negative electrode in the longitudinal direction thereof was a height of 0.5 mm.

Further, the same test as example 1 was carried out. The results are shown in Table 1.

Example 6

The same secondary battery as example 5 was used to carry out the same test as example 2. The results are shown in Table 1.

Example 7

A plurality of step parts and deviations were formed only on the side edge of the electrode of the side on which the current collection tabs are provided, and the side edge on the opposite side was made a linear side edge without step parts. A secondary battery identical with that of example 3 was manufactured except for the fact that the size of the deviations was made 0.5 mm.

Further, the same test as example 1 was carried out. The results are shown in Table 1.

Example 8

The same secondary battery as example 7 was used to carry out the same test as example 2. The results are shown in Table 1.

Example 9

A secondary battery identical with that of example 1 was manufactured except for the fact that the size of the deviations formed on both side edges of the positive electrode in the longitudinal direction thereof was a height of 1 mm, and the size of the deviations formed on both side edges of the negative electrode in the longitudinal direction thereof was a height of 1 mm.

Further, the same test as example 1 was carried out. The results are shown in Table 1.

Example 10

The same secondary battery as example 9 was used to carry out the same test as example 2. The results are shown in Table 1.

Example 11

A plurality of step parts and deviations were formed only on the side edge of the electrode of the side on which the current collection tabs are provided, and the side edge on the opposite side was made a linear side edge without step parts. A secondary battery identical with that of example 3 was manufactured except for the fact that the size of the deviations was made 1 mm at that time.

Further, the same test as example 1 was carried out. The results are shown in Table 1.

Example 12

The same secondary battery as example 11 was used to carry out the same test as example 2. The results are shown in Table 1.

Comparative Example 1

A secondary battery in which an amount of discontinuous deviations formed on the side edges of the positive electrode and negative electrode was made 0.05 mm, and the other configurations were identical with example 1 was manufactured. Further, when the same overcharge test as example 1 was carried out thereon, the temperature rise did not stop, and this led to thermal runaway. The experiment was repeated three times, and the battery led to thermal runaway two times. The results are shown in Table 1.

Comparative Example 2

A secondary battery in which a positive electrode and negative electrode without discontinuous deviations on the side edges, and with a configuration otherwise identical with example 1, was manufactured. Further, when the same overcharge test as example 1 was carried out on this secondary battery, the battery led to thermal runaway. The experiment was repeated three times, and the battery resulted in thermal runaway three times. The results are shown in Table 1.

TABLE 1

| | Amount of deviation | Side edge including deviation | Kind of safety test | Number of times of leading to thermal runaway |
|---|---|---|---|---|
| Example 1 | 0.2 mm | Both sides | Overcharge | 0 |
| Example 2 | 0.2 mm | Both sides | External short-circuit | 0 |
| Example 3 | 0.2 mm | Tab side | Overcharge | 1 |
| Example 4 | 0.2 mm | Tab side | External short-circuit | 0 |
| Example 5 | 0.5 mm | Both sides | Overcharge | 0 |
| Example 6 | 0.5 mm | Both sides | External short-circuit | 0 |
| Example 7 | 0.5 mm | Tab side | Overcharge | 0 |
| Example 8 | 0.5 mm | Tab side | External short-circuit | 0 |
| Example 9 | 1 mm | Both sides | Overcharge | 0 |
| Example 10 | 1 mm | Both sides | External short-circuit | 0 |
| Example 11 | 1 mm | Tab side | Overcharge | 1 |
| Example 12 | 1 mm | Tab side | External short-circuit | 0 |
| Comparative Example 1 | 0.05 mm | Both sides | Overcharge | 2 |
| Comparative Example 2 | (None) | (None) | Overcharge | 3 |

As compared examples 1, 5, and 9 of Table 1 with comparative example 2, it can be seen that examples 1, 5, and 9 wherein the electrode includes the discontinuous step parts on the side edge thereof are clearly higher in the safety than comparative example 2 wherein the electrode has no step parts on the side edge thereof.

As compared examples 1, 5, and 9 of Table 1 with comparative example 1, it can be seen that examples 1, 5, and 9 wherein the electrode includes the discontinuous step parts of 0.2 mm or more on the side edge thereof are clearly higher in the safety than comparative example 1 wherein the electrode has step parts of 0.05 mm no step parts on the side edge thereof.

As disclosed in examples 1 to 18, it can be seen that when the electrode has discontinuous step parts of 0.2 to 1 mm on the side edge thereof, substantially the same degree of safety can be obtained.

When example 1 and example 3 of Table 1 are compared with each other, it can be seen that a higher degree of safety is obtained when an electrode with step parts on both side edges is used than when an electrode with discontinuous step parts each having a height of 0.2 mm or larger only on the side edge of the electrode on which the current collection tabs are provided is used. As to the external short-circuit test, when example 2 and example 4 are compared with each other, electrodes in which deviations of 0.2 mm are discontinuously formed irrespectively of both sides edges or one side edge of the electrode retain the same high degree of safety.

The reason for this is that in the external short-circuit test, a large current flows through the secondary battery, and it is conceivable that the Joule heat generation is larger at the current collection tab part at which the cross-sectional area of the current path is small, and hence the temperature is liable to rise in the vicinity of the current collection tab. In that case, contraction is liable to occur on the current collection tab side of the separator, and hence it is conceivable that the adverse influence on the contraction of the separator on the current collection tab side is identical in both the electrode of example 2 and electrode of example 4.

The present invention is not limited directly to the embodiment described above, and its components may be embodied in modified forms without departing from the spirit of the invention. Further, various inventions may be formed by suitably combining any number of components described in connection with the foregoing embodiment.

Figure 6:
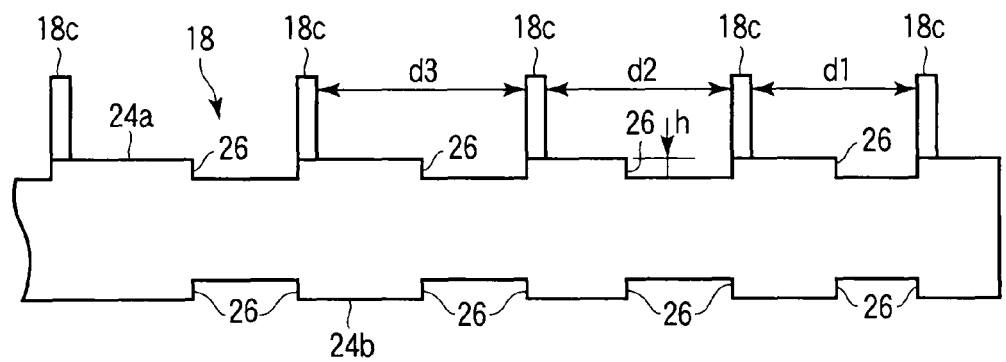
FIG. 6 is a plan view showing an electrode of a non-aqueous electrolyte secondary battery according to another embodiment.

For example, when on each of both side edges of the current collector of the electrode, a plurality of discontinuous step parts and deviations are formed, the present invention is not limited to the configuration in which the width of the current collector is made constant over the entire length in such a manner that the directions of the deviations are identical on both side edges as shown in FIG. 5, and the directions of the deviations may be made opposite to each other on both the side edges as shown in FIG. 6.

What is claimed is:

1. A secondary battery comprising:
an electrode body formed by superimposing a positive electrode including a belt-shaped positive electrode current collector, a positive electrode active material layer formed on a surface of the positive electrode current collector, a plurality of positive electrode tabs protruding from one side edge of the positive electrode current collector in a longitudinal direction thereof, and formed integral with the positive electrode current collector; and
a negative electrode including a belt-shaped negative electrode current collector, negative electrode active material layer formed on a surface of the negative electrode current collector, a plurality of negative electrode tabs each protruding from one side edge of the negative electrode current collector in a longitudinal direction thereof, and formed integral with the negative electrode current collector; upon each other with a belt-shaped separator interposed between the electrodes, and rolling up the positive and negative electrodes and the separator into a spiral shape,
at least one side edge of the positive electrode current collector in the longitudinal direction thereof including a plurality of step parts discontinuously formed in the longitudinal direction at unequal intervals, and extending at both sides of each step part with a deviation of 0.2 mm or more, and 1 mm or less, and at least one side edge of the negative electrode current collector in the longitudinal direction thereof including a plurality of step parts discontinuously formed in the longitudinal direction at unequal intervals, and extending on both sides of each step part with a deviation of 0.2 mm or more, and 1 mm or less.

2. The secondary battery according to claim 1, wherein each of the step parts of the positive electrode current collector is formed on the side edge of the positive electrode current collector on which the positive electrode tabs are provided, and is formed out of the positive electrode tabs, and each of the step parts of the negative electrode current collector is formed on the side edge of the negative electrode current collector on which the negative electrode tabs are provided, and is formed out of the negative electrode tabs.

3. The secondary battery according to claim 1, wherein each of both side edges of the positive electrode current collector in the longitudinal direction thereof includes a plurality of step parts discontinuously formed in the longitudinal direction at unequal intervals, and each side edge of the positive electrode current collector extends on both sides of each step part with a deviation of 0.2 mm or more, and 1 mm or less, and each of both side edges of the negative electrode current collector in the longitudinal direction thereof includes a plurality of step parts discontinuously formed in the longitudinal direction at unequal intervals, and each side edge of the negative electrode current collector extends on both sides of each step part with a deviation of 0.2 mm or more, and 1 mm or less.

4. The secondary battery according to claim 1, wherein the positive electrode tabs of the positive electrode are arranged at unequal intervals in the longitudinal direction of the positive electrode current collector, and the negative tabs of the negative electrode are arranged at unequal intervals in the longitudinal direction of the negative electrode current collector.

5. The secondary battery according to claim 1, wherein when the number of the step parts formed on the positive electrode current collector is set as N1, and the number of turns of the rolled up positive electrode is set as N2, a relationship of $N1>(N2 \div 2)$ is satisfied, and when the number of the step parts formed on the negative electrode current collector is set as M1, and the number of turns of the rolled up negative electrode is set as M2, a relationship of $M1>(M2 \div 2)$ is satisfied.

6. The secondary battery according to claim 1, wherein a width of the positive electrode current collector and width of the negative electrode current collector are different from each other.

7. The secondary battery according to claim 6, wherein a width of the separator is larger than the width of the positive electrode current collector and width of the negative electrode current collector.

* * * * *